US008392354B2

(12) United States Patent
Salemann

(10) Patent No.: US 8,392,354 B2
(45) Date of Patent: Mar. 5, 2013

(54) PROBABILISTIC VOXEL-BASED DATABASE

(75) Inventor: Leo Salemann, Sammamish, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 516 days.

(21) Appl. No.: 12/707,259

(22) Filed: Feb. 17, 2010

(65) Prior Publication Data

US 2011/0202492 A1 Aug. 18, 2011

(51) Int. Cl.
*G06F 15/00* (2006.01)
*G06F 15/18* (2006.01)
*G06T 17/00* (2006.01)

(52) U.S. Cl. .......................... 706/62; 345/424

(58) Field of Classification Search .................... 706/62; 345/424
See application file for complete search history.

(56) References Cited

PUBLICATIONS

P. Noriega and O. Bernier, "Real Time Illumination Invariant Background Subtraction Using Local Kernel Histograms", British Machine Vision Association, 2006, pp. 1-10.*
Lalonde, J., et al., "Natural terrain classification using three-dimensional ladar data for ground robot mobility," [online] Journal of Field Robotics, vol. 23, No. 10, Nov. 2006, pp. 839-861, retrieved from the Internet: <http://www.ri.cmu.edu/publication_view.html?pub_id=5611>.
Pollard, T., et al., "Change Detection in a 3-D World," [online] 2007 IEEE Conference on Computer Vision and Pattern Recognition, Jun. 17-22, 2007, retrieved from the Internet: <www.lems.brown.edu/~tpollard/pollard_mundy_cvpr07.pdf>.
Mundy, J., et al., "Uncertain geometry: a new approach to modeling for recognition," [online] Proceedings of the SPIE, Automatic Target Recognition XIX, vol. 7335, pp. 73350Q-73350Q-12, May 4, 2009, retrieved from the Internet: <http://www.lems.brown.edu/~ozge/SPIE-Mundy-OzcanliFinal.pdf>.
Gebhardt, S., et al., "Polygons, point clouds, and voxels, a comparison of high-fidelity terrain representations," 2009 SIWZIE Awards, Simulation Interoperability Standards Organization, Nov. 20, 2009.

\* cited by examiner

*Primary Examiner* — Kakali Chaki
*Assistant Examiner* — Vincent Gonzales
(74) *Attorney, Agent, or Firm* — Terry M. Sanks, Esq.; Beusse Wolter Sanks Mora & Maire, P.A.

(57) ABSTRACT

A probabilistic database can including a set of geospatially referenced records and a probability engine. The geospatially referenced records corresponding to a real-world volumetric space indexed against voxels. Each voxel can have a unique identifier in the probabilistic database. Each voxel can corresponds to a volumetric unit of the real-world volumetric space. Geospatial information referenced against voxels can be internally inconsistent, which results in a naturally probabilistic storage format. The probability engine can be operable to dynamically determine a certainty value for an object of the probabilistic database. The certainty value can be a value from zero to one hundred percent, which is based upon a statistical analysis of the internally inconsistent geospatial information referenced against the voxels. The internally inconsistent geospatial information can correspond to a volumetric unit of the real-world volumetric space in which the object has a probability of residing within.

24 Claims, 11 Drawing Sheets

Customize Interface Mode 230

SELECT INTERFACE  SELECT ACTIVE MODE 232

| PRODUCT A ▼ |
| SCREEN A ▼ |

- ⦿ Binary Mode
- ○ Inference Mode
- ○ Graduated Mode
- ○ Custom (Click of Edit)

---

BINARY MODE SETTINGS 234

Certainty Threshold [20 % ▼]
Obscuring Pattern [Black Out Region ▼]

INFERENCE MODE SETTINGS 236

Certainty Threshold [20 % ▼]
Inference Engine [Engine A ▼]

(Click to Configure This Engine)

GRADUATED MODE SETTINGS 238

Certainty Sensitivity [Normal (1%) ▼]
Visual Cue [BLUR ▼]

Cue Minimum Value [None ▼]
Cue Maximum Value [70 Percent ▼]

Show Certainty Value on Mouse
Pause in Flyover? ☒

[APPLY] [CANCEL]

FIG. 2B

Inference Mode Interface 250 Embodiments

PROBABILISTIC VOXEL-BASED DATABASE

BACKGROUND

The present disclosure relates to the field of probabilistic databases, and, more particularly, to probabilistic voxel-based database that driving different uncertainty-level dependent query and interface modes.

A probabilistic database is an uncertain database in which database records have associated probabilities. Probabilistic databases establish a data recording and querying methodology that provide a uniform approach for handling imprecision.

No current commercial probabilistic database systems exist; many research prototypes exist which include the May-BMS project at Cornell University, the MystiQ project at the University of Washington, the Orion project at Purdue University, and the Trio project at Stanford University. Current projects use probabilistic versions of conditional tables as an encoding mechanism for uncertainty handling. Consequently, incoming information is handled in a standard way, where additional overhead is added for expressing uncertainty, which is an inherently inefficient representation scheme that adds substantial storage overhead.

No known probabilistic database has been used within a geospatial information system (GIS) to handle geospatial data. No known set of geospatial end-user interfaces present geospatial content in a variable manner that visually corresponds to different uncertainty levels of geospatial data.

BRIEF SUMMARY

The disclosure is for a probabilistic voxel database for geospatial information, such as information maintained in a voxel geospatial information system (GIS). The voxel database can inherently store data in a probabilistic manner, as conflicting information from different sources can be combined into a volumetric storage space. The database storage mechanism for the volumetric storage space can encode geospatial data in a raster-based manner, unlike the traditional vector based storage mechanism of a conventional GIS, which is a non-probabilistic storage mechanism.

In one embodiment, an uncertainty query engine of the voxel database can be designed to search/retrieve partially specified geospatial information. In these queries, a range of uncertainty can be specified, where voxel query results only return information having the specified range of uncertainty. In one embodiment, the uncertainty of information can be dynamically determined at a time of querying based on uncertainty inherent in the voxel database volumetric storage methodology. In one embodiment, different query modes are contemplated, such as a binary query mode, an inferential query mode, and a graduated query mode, which produce different results based on handling uncertainty of data sets in different mode specific ways.

In one embodiment, a set of end-user interfaces can be linked to voxel database information. The user-interfaces can present information at different levels of uncertainty in different ways in accordance with a set of specialized interface modes, such as a binary mode, an inferential mode, and a graduated mode. The binary mode can either show or hide geospatial information within an interface based on whether the geospatial information exceeds a fixed threshold value of uncertainty. The inferential mode fills-in geospatial blanks of the underlying data set, even though the resulting output includes best-estimate values that may be inaccurate. The graduated mode can visually represent a level of uncertainty using a set of visual cues (a level of transparency, a contrast, a blurring, a texture, a hue, etc.). As a level of uncertainty changes, a value of a variable visual cue can change in a corresponding fashion.

One aspect of the disclosure is for a probabilistic database including a set of geospatially referenced records and a probability engine. The geospatially referenced records correspond to a real-world volumetric space indexed against voxels. Each voxel can have a unique identifier in the probabilistic database. Each voxel can correspond to a volumetric unit of the real-world volumetric space. Geospatial information referenced against voxels can be internally inconsistent, which results in a naturally probabilistic storage format. The probability engine can be operable to dynamically determine a certainty value for an object of the probabilistic database. The certainty value can be a value from zero to one hundred percent, which is based upon a statistical analysis of the internally inconsistent geospatial information referenced against the voxels. The internally inconsistent geospatial information can correspond to a volumetric unit of the real-world volumetric space in which the object has a probability of residing within.

One aspect of the disclosure is for a voxel database for storing probabilistic geospatially referenced information within an indexed tangible storage medium. The voxel database can include voxel records stored in a voxel table. Each of the records can have a unique voxel identifier. The voxel database can include hardware and computer program products stored on a tangible storage medium and executable upon said hardware. The voxel table can be stored in a tangible storage medium. Each voxel record can include visual attributes of a geometric space. Uniquely defined voxels of voxel database can each be a volume unit on a grid in volumetric. A correspondence can exist between voxels in the volumetric storage space and volume units of a real world volumetric space from which geospatial data was directly gathered and encoded within the voxel database. Each voxel record can also include semantic attributes for the geometric space that are unrelated to generating visual terrain for the geometric space. Voxel referenced geospatial information can be internally inconsistent, which results in a naturally probabilistic storage format.

Another aspect of the disclosure is for a simulation device that includes a processor, a non-volatile memory, a volatile memory, at least one input device, at least one output device, a bus communicatively linking the processor non-volatile memory, volatile memory, the input device, and the output device to each other, and a set of computer program products tangibly stored on the non-volatile memory or the volatile memory. Instructions of the computer program products can be executable by the processor. The computer program products can include a voxel engine able to directly consume voxel-encoded volumetric data for of a volumetric storage space. Each of the voxels can be a volume unit on a grid in three dimensional space, which is the volumetric storage space, wherein a correspondence exists between voxels in the volumetric storage space and volume units of a real world volumetric space from which geospatial data was directly gathered and encoded as the voxel-encoded volumetric data. A correspondence can exist between voxels in the volumetric storage space and simulation units in a simulation space. A simulation application can generate a user interactive interface for the simulation space. The simulation application can receive user input via the plurality of input device and responds to the user input by altering expressed characteristics of the simulation space. Output for the simulation space can be produced by the output devices. The simulation application can permit a user to selectively navigate within the simulation space. The user interactive interface can include at least two different user selectable interactive modes. Each of the modes can change how the user interface handles objects of the simulation space based upon a certainty level value associated with each of the objects. The volumetric storage space can be a probabilistic space. The certainty level can reflect a probability that the associated object of the volumetric storage space exists in the corresponding real world volumetric space.

In another aspect of the invention, a set of sensors can capture raw data that geospatially corresponds to a real world volumetric space. The real-world volumetric space can be segmented into a set of regular volumetric units. Datum of the raw data can be indexed against the regular volumetric units. Each regular volumetric unit of the real-world volumetric space can be mapped to a voxel in a volumetric storage space. Within a voxel database, a set of records can be established in a voxel table. Each of the records can have a unique voxel identifier. For each record, values can be stored for a set of different attributes. Voxel referenced geospatial information corresponding to the real-world volumetric space can be stored in an internally inconsistent manner, which results in a naturally probabilistic storage format. A request for voxel database information can be received for a request defined volume of volumetric storage space. The voxel database can be queried to generate a response set of voxels and attributes associated with the voxels. The set of voxels can consist of the voxels of the defined volume of volumetric storage space. During the querying, a certainty level value for objects of the result set can be dynamically determined. The certainty value can be a value from zero to one hundred percent which is based upon a statistical analysis of the internally inconsistent geospatial information referenced against the voxels. The internally inconsistent geospatial information can correspond to a volumetric unit of the real-world volumetric space in which the object has a probability of residing within. The response set can be provided to a simulator having a user interface for a simulated three dimensional volume of space that corresponds to said defined volume of volumetric storage space.

BRIEF DESCRIPTION OF THE SEVERAL VIEWS OF THE DRAWINGS

FIG. 2B shows an interface mode configuration interface in accordance with an embodiment of disclosure.

DETAILED DESCRIPTION

Figure 1:
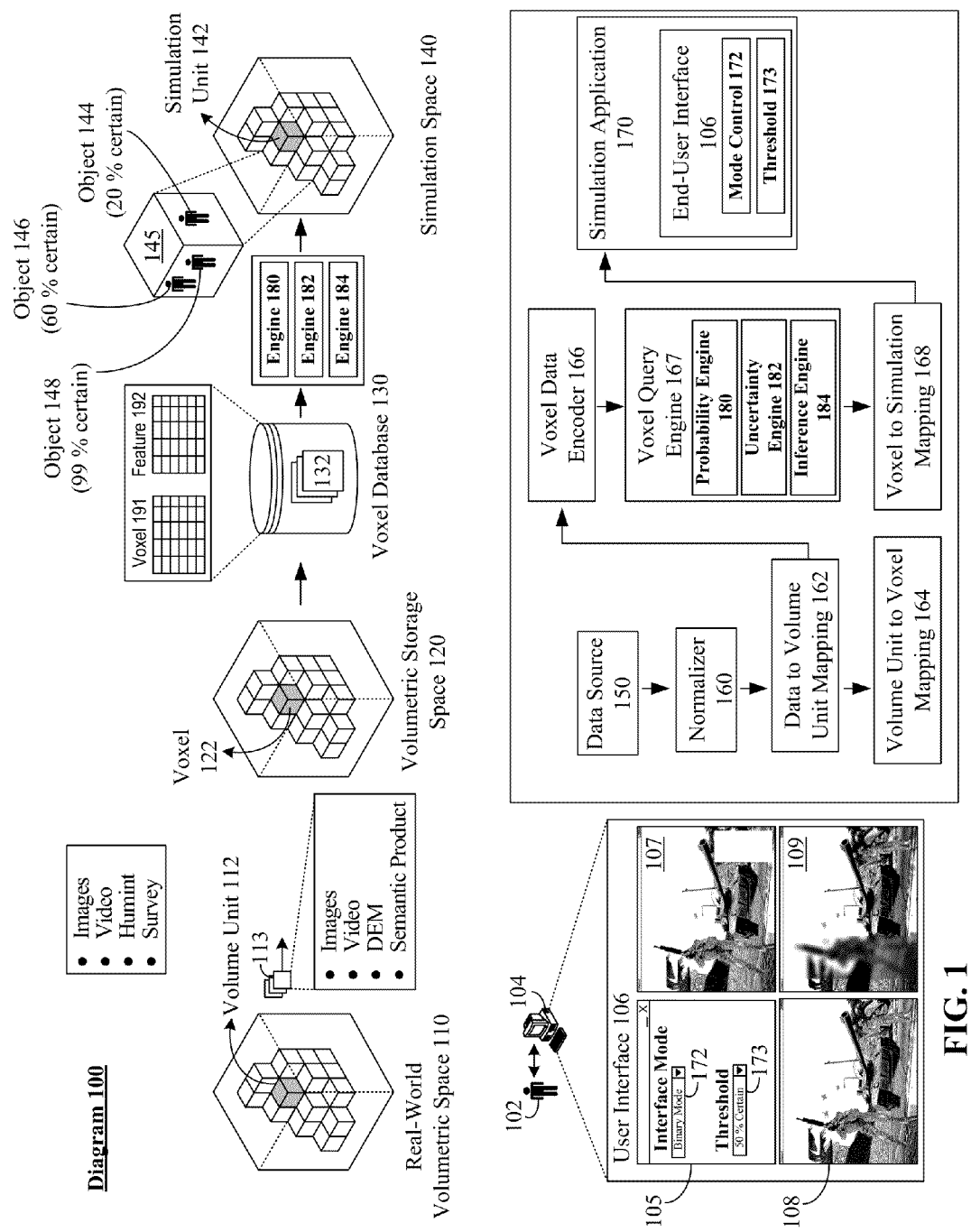
FIG. 1 is a schematic diagram showing a probabilistic voxel database storing geospatial information in accordance with an embodiment of the disclosure.

The disclosure provides a volumetric storage space 120 that handles storing uncertain data. The volumetric storage space 120 can be a space composed of a set of volumetric units, called voxels 122. Data elements can be directly referenced to voxels 122, which permits these data elements to be spatially placed in the volumetric storage space 120. The data elements need not have any specific identity outside their relationship to the voxels 122, which permits raw data to be inserted into the volumetric storage space 120. For example, satellite imagery, LIDAR points, and other information can all be inserted into the volumetric storage space 120 and referenced to voxels 122. Viewed in one manner, each voxel 122 can be thought of as a three dimensional puzzle piece that fits together with other puzzle pieces to form the volumetric storage space 120. Information included in the volumetric storage space 120 can be extracted post-storage. For example, outlines of objects can be detected within the volumetric storage space 120 to determine a presence or absence of a building, vehicle, crowd, or other object within the volumetric storage space 120.

It should be noted that data elements can be continuously inserted into the volumetric storage space. In this manner, data elements can be combined to continuously increase a "resolution" of the data image contained within the volumetric storage space 120. In one embodiment, the volumetric storage space 120 can be a probabilistic one. In other words, data elements can be stored in the volumetric storage space 120 that have a probability of being contained therein but have a probability of not actually being contained therein. For example, if an incomplete "data image" of a building (which can be formed by 1 . . . N quantity of voxels) exists in the volumetric storage space 120, an associated probability of the building being present in the volumetric storage space 120 can be at a value of forty percent where a sixty percent probability value exists that the building is not present in the volumetric storage space 120. Thus, the volumetric storage space 120 is able to handle uncertainty of data elements in a manner that traditional storage spaces cannot.

The volumetric storage space 120 can store data elements of any nature. For example, the data elements of the volumetric storage space 120 can include visual information in two or three dimensions. Data elements can also include material composition elements, elevation data, and the like. Any type of information that can be spatially related to a volumetric unit (e.g., voxel) can be stored in the volumetric storage space 120.

Another way of expressing the volumetric storage space 120 is by using database terminology. Stated differently, each voxel 122 can have a unique identifier, which in a database system (e.g., database 130) can be a primary key of a database table having voxel records. Data elements of the volumetric storage space 120 can be attributes of the voxel records. Relative reference points of data elements within a corresponding voxel can be optionally recorded, should a spatial positioning of a data element be needed at a level of granularity less than a single voxel 122. The only linkage of each data element within the database 130 can be defined by its relationship to a voxel 122. That is, instead of referencing visual, material, or other characteristics of a building to that building, as would be the case with a standard database—visual, material, or other characteristics can be referenced directly to voxels 122.

This ability to relate any number of characteristics (e.g., data elements) having a spatial component to the volumetric storage space 120 at a suitable spatial location (via voxel referencing) is significant and unique to a voxel database 130. It is this ability that permits "raw" data to be directly inserted into the volumetric storage space 120. The raw data (e.g., satellite data, for example) when acquired is typically formatted in a spatial manner well suited for proper insertion into the volumetric storage space 120. Otherwise, input acquired from satellites (or similar sources) must be processed and categorized to specific objects (e.g., buildings, roads, etc). These objects are typically stored in databases as discrete entities having object specific attributes. Each time processing occurs, a data loss can result, as assumptions, which must be made during processing, may not be true. For example, during processing, material composition attributes are historically stored against to objects (e.g., buildings, roads, etc.) formed from these materials. There may be, however, uncertainty in which of a set of possible objects are actually present in a given spatial region. Thus, during processing, material composition attributes can be stored against the wrong objects. Conventional practices (that do not utilize a volumetric storage space 120) may attempt to correct for processing errors, as described above. Error correction techniques, however, do not change the fact that there is a fundamental disconnect with the paradigm used for storing data given the manner in which this data is acquired. Use of a volumetric storage space 120 is believed to resolve this disconnect, and believed to achieve numerous advantages as described herein.

FIG. 1 is a schematic diagram 100 showing the probabilistic voxel database 130 storing geospatial information in accordance with an embodiment of the disclosure. In diagram 100, one or more data sources 150 can capture data 113 spatially related to volume units 112 of a real-world volumetric space 110. This relative raw information can be encoded in a voxel database 130. The encoding can directly map volume units 112 of real-world space 110 to voxel units 122 of volumetric storage space 120. Specific database 130 records 132 can include voxels records of voxel table 191, where each record is indexed against a unique voxel 122. Records 132 can also include feature records of feature table 192, where each feature represents a real world object (e.g., building, structure, entity, etc.). Each feature record of table 192 can include a unique feature identifier. Feature (table 192) and voxel (table 191) records can be indexed to each other within database 130.

The voxel 122 linked (e.g., geospatially related) data stored in database 130 is not necessarily consistent. That is, different data sources 150 can provide conflicting information. For example, a set of different images (each being a discrete item of captured data 113) of a real-world space 110 can include different and inconsistent information. Videos, digital elevation models, and other items of data 113 can also include semantic information for objects present in the volumetric space 110. Not all items 113 will consistently present the same objects in the same geospatial positions, yet all data 113 can be stored in volumetric storage space 120 of the voxel database 130.

A probability engine 180 can compute a probability that geospatial information of the voxel database 130 accurately reflects an object in real-world space 110. Uncertainty engine 182 can establish uncertainty based thresholds, parameters, and rules, which determine how objects of volumetric storage space 120 will be expressed in simulation space 140 based upon associated certainty (or uncertainty) values. To illustrate, a given simulation unit 142 can be mapped to a voxel unit 122.

A simulation volumetric space 145 is illustrated in diagram 100, which is formed by any number (0 . . . N, where 0 denotes a fractional portion of a unit 142) of simulation units 142 The simulation space 145 can include a number of objects 144-148, where each object 144-148 has an associated level of certainty or uncertainty. As shown, object 144 can have a twenty percent certainty value; object 146 can have a sixty percent certainty value; and object 148 can have a ninety nine percent certainty value. The certainty values (twenty percent, sixty percent, ninety-nine percent) associated with 144-148 can be dynamically computed by probability engine 180. Whether objects 144-148 appear within a user interface 106 showing simulation space 140 can depend upon the uncertainty engine 182 decisions, which are based on probability engine 180 computed values.

It should be appreciated that most (but not all) objects 144-148 can be much larger than a single voxel 122 (or unit 142). Certainty computations per voxel 122 need not directly coincide with certainty computations for objects 144-148. For example, a single voxel 122 can be thought of as having a twenty percent certainty of being occupied by air, a thirty percent certainty of being occupied by part of Object 144, a fifty percent certainty of being occupied by part of Object 146, etc. Statistical operations based on the voxel 122 level calculations can be used to determine the object-level certainty percentages.

In diagram 100, a user 102 of computer 104 can interact with a simulation space 140 via simulation application 170 having user interface 106. The user interface 106 can include a configuration screen/region 105, which includes a mode control 172. The mode control 172 can permit the user 102 to determine how objects 144-148 are to be displayed in interface 106 in lieu of their certainty levels (which can be dynamically computed by the probability engine 180). Modes can include, but are not limited to: a binary mode that results in binary mode screen 107; an inference mode that results in inference mode screen 108; and a graduated mode, which results in graduated mode screen 109. All of the different screens 107-109 reflect the same simulation space 140, but objects 144-148 are handled differently from screen-to-screen.

For example, all objects (144-148) having a certainty level under a configurable (via setting 173) threshold value can be absent from binary mode screen 107, while objects having a certainty level over the threshold are shown in screen 107. Areas of binary screen 107 having unknown (or uncertain) content can be blanked out. For instance, when setting 173 establishes a threshold of fifty percent, object 146 and 148 can be shown in screen 107, while object 144 can be absent (and can be represented by a blank region of screen 107).

In contrast, inference mode screen 108 can always show objects 144-148 with perfect clarity. This is true even when portions of data are missing from simulation space 140. These portions can be inferred using inference engine 184 which provides a best guess of simulation space 140 content, which does not necessarily correspond to the reality of real-world volumetric space 110. Thus, inference mode screen 108 is able to sacrifice simulation accuracy for simulation clarity.

Graduated mode screen 109 can present all objects 144-148 in simulation space 140 to a user without inferring information not present within voxel database 130. Visual cues can be utilized to indicate a level of certainty of the objects 144-148 presented in screen 109. For example, object 144 can be eighty percent blurred to visually indicate that it has an associated 20 percent certainty value. Object 146 can be forty percent blurred to visually indicate that it has a sixty percent certainty value. Object 148 can be one percent blurred to visually indicate that it has a ninety-nine percent certainty value. Any number of graduate-able visual cues can be used by the graduated interface screen 109 (applying different tints; icons for meter levels; transparency levels; etc.) to express a level certainty level value for the shown objects 144-148.

Turning to the end-to-end process of the system of diagram 100, data sources 150 can utilize a set of sensors to capture and record data 113 for a specific volume unit 112. The data 113 can include images, video, unmanned vehicle feeds, signals intelligence (SIGINT) information, human intelligence (HUMINT) data, and the like. Semantic content of the data 113 can include weather, visual appearance, elevation, temperature, humidity, terrain composition, civilian density and location, force density and location, and other definable attributes of volume unit 112 and/or objects within volume unit 112.

Before converting data 113 into voxel 122 mapped records 132, the data 113 can be optionally normalized (by normalize 160) to a definable standard. A data to volume mapping unit 162 can determine which unit 112 data 113 elements correspond to. Then, volume unit to voxel mapping component 164 can determine which voxel 122 corresponds to which volume unit 112. The voxel database 130 can be associated with a voxel query engine 167, which permits records 132 to be retrieved based on requestor supplied criteria. Voxel query engine 167 can include probability engine 180, uncertainty engine 182, and inference engine 184.

Voxel data encoder 166 can digitally encode the data 113 into a voxel database 130 format. In one embodiment, a set of optional filters can be established between the voxel database 130 and a related simulation space 140. Filters can include voxel to simulation mapping modules. Ultimately, simulation space 140 data can be presented in end-user interfaces 106. The interface 106 can include a selectable set of interface modes (control 172), which determine a manner in which objects 144-148 are presented based upon associated uncertainty levels.

Figure 2A:
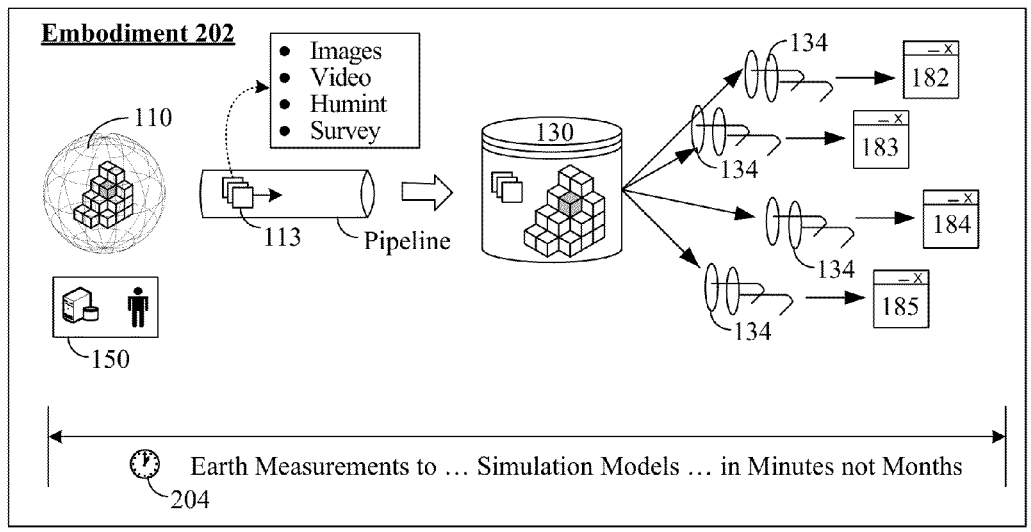
FIG. 2A describes an embodiment for populating and using a voxel database and a simulator able to consume data of the voxel database.
Figure 2A:
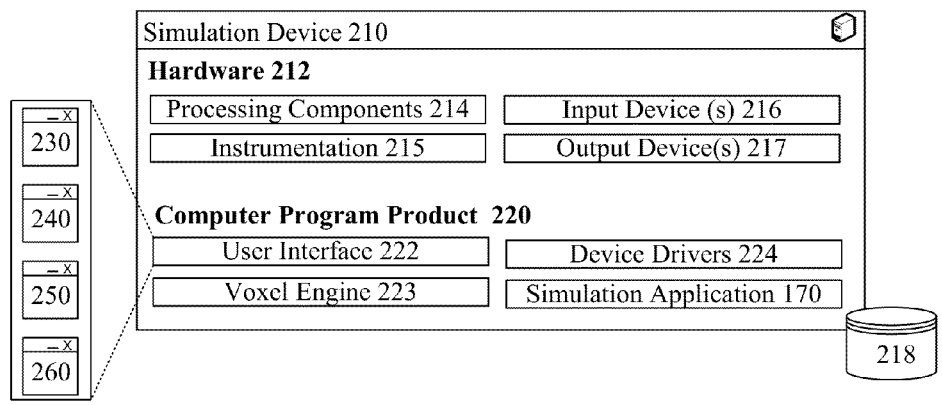

Embodiment 202 of FIG. 2A provides another description for populating and using voxel database 130. Using embodiment 202 as a description reference, data 113 captured from a real-world volumetric space 110 can be conveyed over a single pipeline to a voxel database 130. The data 113 can come from many sources 150, such as satellite imagery, digital elevation model (DEM) data, video, SIGINT, HUMINT, and the like. Additionally, the filtered (134) voxel database 130 can provide data for multiple different types of simulators (simulation space 140). For example, assuming the simulators all include terrain models for a real-world volumetric space 110, SAF simulators 182, constructive simulators 183, thermal simulators 184, radar simulators 185, and the like can all be generated from voxel database 130 stored records 132.

The common database 130 product can be a probabilistic one in which uncertainty is handled. It should be appreciated that embodiment 202 can be largely automated, which permits the process 212 from taking measurements, to producing simulation models to occur within minutes (under thirty minutes or under twenty four hours, for example) and not months, as is the case with conventional information gathering and modeling processes.

FIG. 2A also shows a schematic diagram of a simulation device 210 for presenting and processing simulation space 140 data. Simulation devices 210 can vary greatly in terms of hardware 212 and computer program products 220 used, which causes user interfaces 222 (which includes interface 106, in one embodiment) to vary accordingly.

The hardware 212 can include a number of components 214-218. Processing components 214 of the hardware 212 can include one or more microprocessors, memory, a bus, network cards, and the like. Instrumentation 215 can include radar displays, altimeters, speedometers, and other buttons and gauges. Input devices 216 can include a keyboard, mouse, touch screen, joystick, cameras, movement detectors, pressure sensors, temperature sensors, laser sensors (e.g., Multiple Integrated Laser Engagement System (MILES) compliant ones) and the like. The output devices 217 can include visual displays, audio speakers, and/or other sensory output devices (e.g., somatosensory output devices, olfaction output devices, gustation output devices, etc.). Data store 218 can be a tangible storage media.

The computer program products 220 of the simulation device 210 can include user interface 222, voxel engine 223, simulation application 170, device drivers 224, and the like. The device drivers 224 can facilitate communications between an operating system (not shown, but is one contemplated computer program product 220) and a specific hardware (such as devices 214-218).

Voxel engine 223 can be an engine able to consume data of the voxel database 130. In one embodiment, the engine 223 can process a set of voxels 122 or a portion of volumetric storage space 120 consisting of any number of voxels. The voxel engine 223 can generate characteristics of a simulation space 140. In one embodiment, the voxel engine 223 can include one or more of the probability engine 180, uncertainty engine 182, and inference engine 184. In another embodiment, these engines 180-184 can be implemented as components of the voxel database 130 (e.g., implemented in the database server instead of the client device 210). In still another embodiment, functionality of the engines 180-184 can be implemented within a network linked server (outtake server 420 of FIG. 4, for example).

Simulation application 170 can include any executable program that utilizes geospatial data of the voxel database 130. The user interface 222 can be a part of the application 170 code and/or can be a front-end for the application 170 code. In various embodiments, simulation application 170 can include an immersion simulation application, a constructive simulation application, a real-world simulation used by intelligence analysts, and the like. Simulation application 170 can be any application able to interactive present simulation space 140 to a user.

The user interface 222 can include one or more uncertainty specific interface modes, which may be configurable depending on implementation choices. Specifically, configuration screen 230 (an instance of interface 105 that is elaborated upon in FIG. 2B), binary mode screen 240 (an instance of interface 107 that is elaborated upon in FIG. 2C), inference mode screen 250 (an instance of interface 108 that is elaborated upon in FIG. 2D), graduated mode screen 260 (an instance of interface 109 that is elaborated upon in FIG. 2E), and/or other such screens can be components of user interface 222.

Although referred to as screens, each of the screens 230, 240, 250, 260 can be implemented as any interface region (e.g., a set of portlets; a set of independent screens; a set of sections of screens; a set of tabbed regions of a screen; etc.). In one embodiment, each screen 240, 250, 260 can represent a user interface segment of a discrete application, which lacks other ones of the screens 240, 250, 260. Specifics of the screens 230, 240, 250, 260 are shown for illustrative purposes only and are not to be construed in a manner that limits the scope of the disclosure.

FIG. 2B shows an embodiment of a configuration screen 230 for specifying configurable parameters relating to uncertainty and a manner in which a user interface is to presenting objects associated with varying certainty values. These parameters can be specific to different products and/or even to specific screens of a product. In the interface 230, a user can select from among a set of different interface modes 232 to be applied to an interface of a selected (e.g., product and/or screen) entity. Options can include binary mode, inference mode, graduated mode, a custom mode, and others. A custom mode can be a combination of any of the other interface modes. For example, a custom mode can be a combined inference/binary mode that infers an existence of an interface object when it has a certainty over an inference threshold (seventy percent, for example) and that obscures objects that have a certainty under a binary threshold (ten percent, for example).

Configuration section 234 can permit a user to customize binary mode settings. For example, a user can establish a certainty threshold and an obscuring pattern for objects with a probability under the threshold value.

Configuration section 236 can permit a user to customize inference mode settings. For example, a user can select a certainty threshold as well as an inference engine that is to be used. Any pattern matching, feature extraction technique can be utilized by the inference engine, specifics of which can be configured. For instance, a user can select whether objects identified as dynamic (e.g., people, moving vehicles, etc.) are to be included or excluded from an interface.

Configuration section 238 can permit a user to customize graduated mode settings. For example, a user can determine a threshold and a type of visual cue. Visual cues can include any number of options, such as an option to blur/sharpen an object; to gradually convert a colored object to black and white; to brighten/darken an object; to change a transparency level of an object; to display an icon/gauge for uncertainty proximate to an object; to change a hue and/or tint level of an object; and combinations and derivatives thereof. Additionally, different minimum and maximum values can be established where graduations are performed within the remaining range. For instance, when a maximum blur value is set for seventy percent, a displayable blur value can be computed by multiplying a certainty value by 0.7 (thus the maximum blur is seventy percent). An option can be set to determine whether a flyover popup showing an uncertainty value of an object is to be presented when a mouse pauses over the object for a given duration. The options and settings 234, 236, 238 of screen 230 are for illustrative purposes only and other configuration options are contemplated.

Figure 2C:
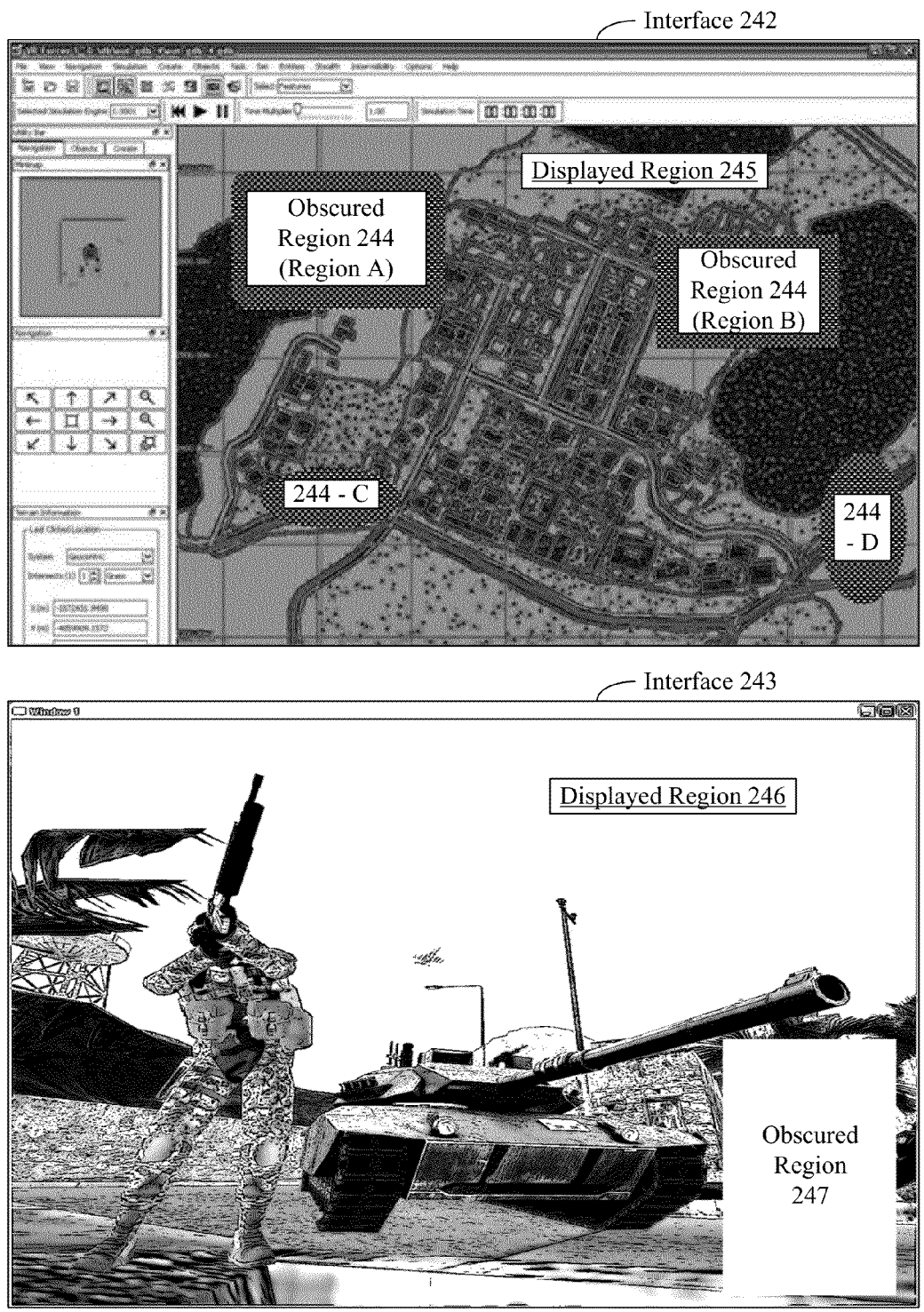
FIG. 2C shows embodiments of binary interfaces.
Figure 2D:
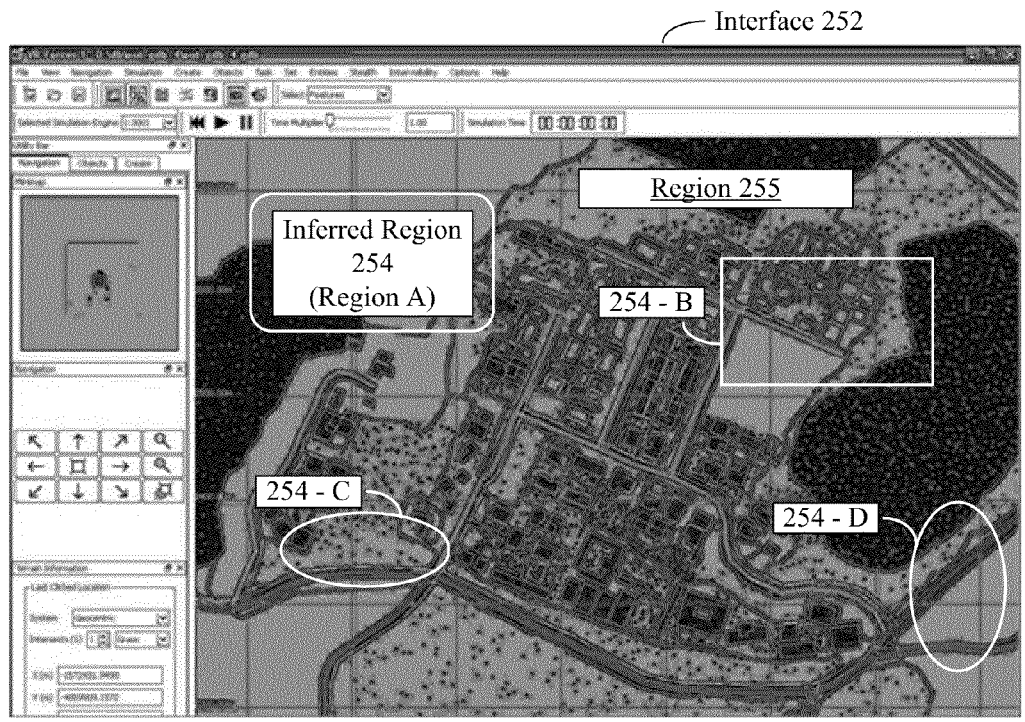
FIG. 2D shows embodiments of inference interfaces.
Figure 2D:
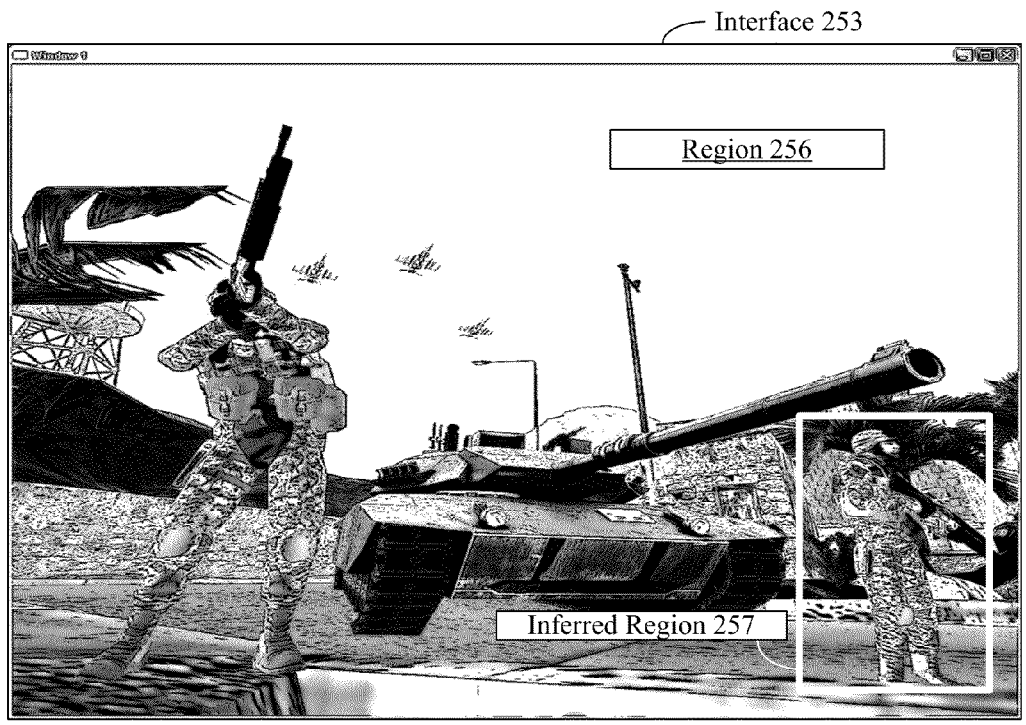
Figure 2E:
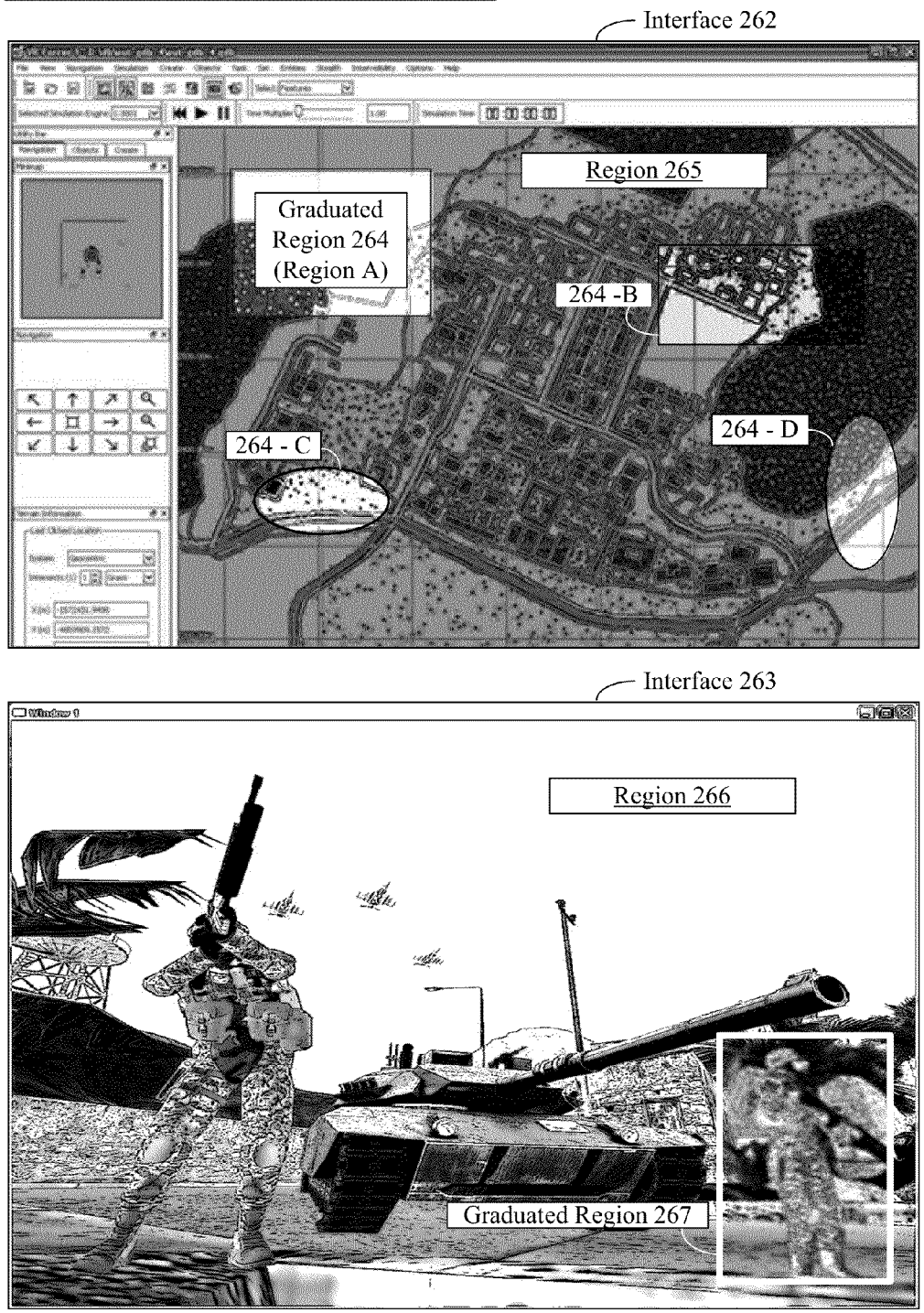
FIG. 2E shows embodiments of graduated interfaces.

FIG. 2C shows binary mode interface 240 embodiments including interface screen 242 and interface screen 243. Different types of screens, such as two or three dimensional interfaces can be placed in binary mode in accordance with the disclosure. Specifically, the examples of FIG. 2C-2E show a top-view map screen 242, 252, 262 and a first person perspective screen 243, 253, 263. Additionally, the various regions of the screens in the examples of FIG. 2C-2E are intended to be consistent, to show various results of a single simulation space 140 state (based on the same underlying data) given different interface modes.

In screen 242 a set of obscured regions 244 (Regions A-D) are shown, which have an associated certainty (or probability that the object is present in a corresponding real world space 110 that corresponds to the shown region of simulated space 140) below a threshold level. Display region 245 shows objects (region) that have an associated probability above or equal to the threshold level. The obscuring pattern of screen 242 can be a black-and-white weave pattern. In contrast, interface 243 can use a solid white color to blank out obscured regions, such as region 247. A majority of objects in screen 243 can be within the displayed region 246, which means that they have an associated probability exceeding the established threshold for certainty.

In one embodiment, the binary mode interfaces can be used as mission rehearsal interfaces. That is, current mission rehearsal environments take a binary approach to uncertainty, rendering features as either fully-known (photo-quality building models, each window or door geo-specifically positioned) or fully-unknown (building as a primer-grey box). Regions 245 and 246 are equivalent to fully-known features and regions 244 and 247 are equivalent to fully-unknown regions. Appreciably, the resulting rendering of a simulation space 140 when a binary mode interface is used will not necessarily have a realistic look overall. Those parts which are realistic will, however, be fully true-to-life and will accurately reflect a situation of the real-world volumetric space 110.

FIG. 2D shows inference mode interface 250 embodiments including interface screen 252 and interface screen 253. The inferred regions 254 (Region A-D) and region 257 have been guessed at by an inference engine 184 and are not necessarily recorded in their entirety within a voxel database 130, from which the simulation space 140 shown in the screens 252, 253 is populated. The non-inferred or displayed regions 255, 256 include objects which are sufficiently specified in a voxel database 130 (i.e., have a certainty value exceeding an established threshold).

In one embodiment, inference mode interfaces can be used for training environments. That is, training environments can strive to be as geo-specific as possible, but in the end the requirement to suspend disbelief and create a sense of presence outweighs the need to track known versus unknown data. Thus, a training requirement interface (used as a simulation training interface) should be able to take uncertain data and infer plausible best estimates, such that the resulting terrain and other visual output has a uniform high degree of realism, even if some features and appearances are conjectural.

FIG. 2E shows graduated mode interface 260 embodiments including interface screen 262 and 263. In screen 262, a light/dark (combined with variable contrast) effect is used as a visual cue for graduated regions 264 (A-D). It should be noted that Region C (having a certainty value of twenty percent, for example) is lighter than Region B (having a certainty value of twenty five percent, for example), which is lighter than Region A (having a certainty value of thirty-two percent, for example), which is lighter than region D (having a certainty value of forty percent, for example). Objects in region 265 can have a certainty value of one hundred percent (or close enough to 100 percent to be rendered in a relatively uniform manner).

In screen 266, a blur effect is used as a visual cue for region 267. The less certainty a region/object has, the more blurry it appears. Thus, region 266 includes objects having certainty value of nearly one hundred percent, where region 267 can be half-blurred, which indicates a certainty value of approximately fifty percent.

In one embodiment, graduated mode interfaces can be used for intelligence analysis work. That is, an analysts can be presented with uncertain data in an as-is form. No inferences are made, and no binary known/unknown truncations are made. The graduated mode interface 262, 263 shows the user the variable degrees to which some parts of the environment (e.g., simulation space 140) are better-known than others.

Graduated mode interfaces 262, 263 can be specifically designed for intelligence analysts, particularly those on the tactical edge, who must rapidly decide where best to deploy local ISR assets to "clear the fog." Graduation mode interfaces 262, 263 can also be useful for managers of intelligence systems, as it rapidly and pictorially shows managers places where additional intelligence is needed so that they can deploy their assets accordingly.

Figure 3A:
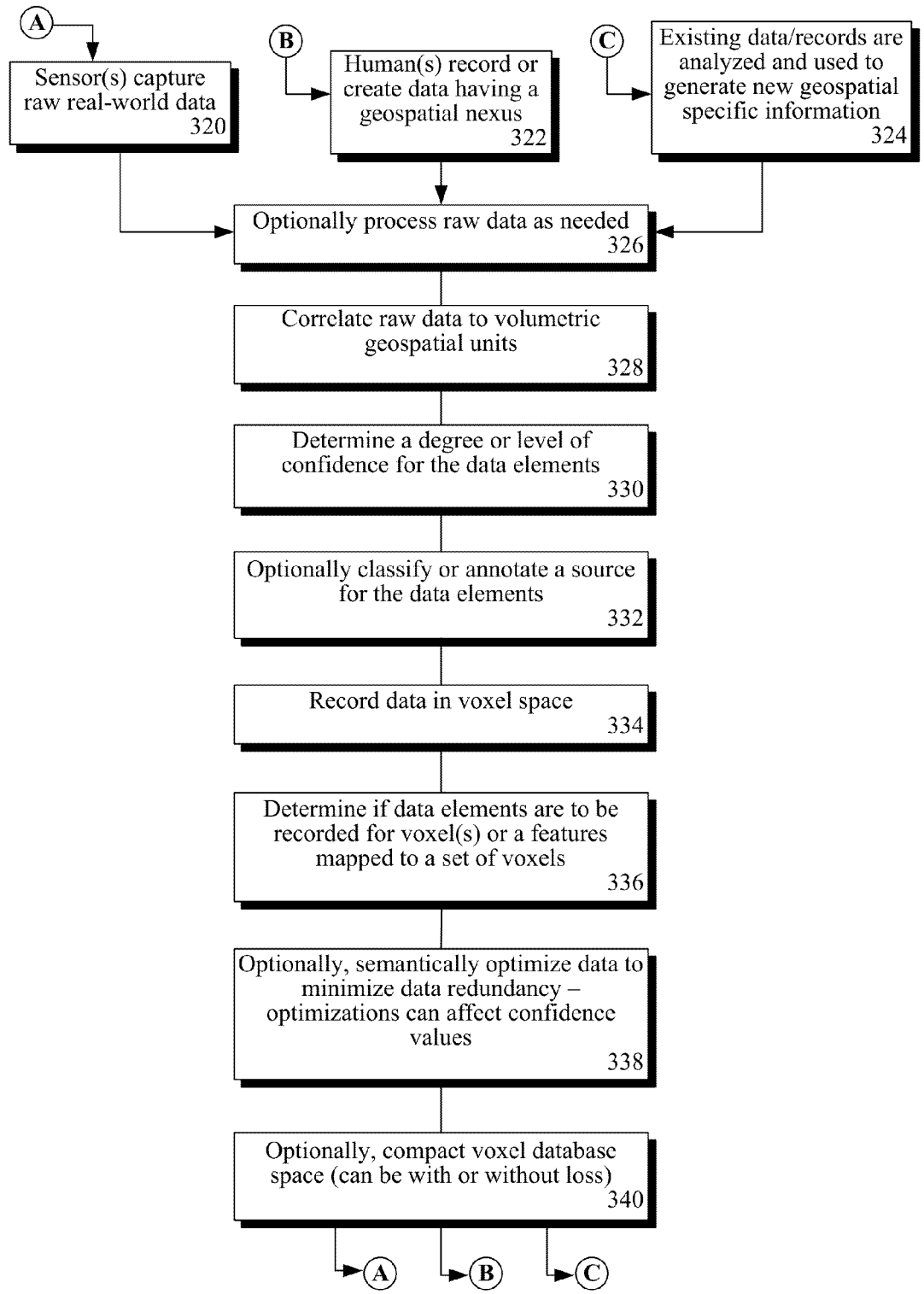
FIG. 3A is a flow chart of a process to acquire voxel database information from a data source in accordance with an embodiment of disclosure.

FIG. 3A shows a process 310 to acquire voxel database 130 information from a data source 150 in accordance with an embodiment of disclosure. In process 310 data can be continuously received from a variety of sources, which include completely automated data capture sources (step 320), human data sources (step 322), and generating new intelligence data (or other information) by analyzing and combining existing source data (step 324). This data can be continuously being handled by the process, as represented by process 310 proceeding from step 340 to steps 320, 322, and/or 324. In process 310, data acquisitions and processes can occur in real-time or after an appreciable delay (e.g., handled in batch) depending upon implementation choices. Further, process 310 actions can occur asynchronously/synchronously as well as cyclically/randomly/based on conditional events depending on contemplated implementation choices.

Regardless of how raw data is gathered (step 320, 322, or 324), the data can be optionally processed as needed, as shown by step 326. In step 328, the raw data can be correlated to volumetric geospatial units and/or to populations present in the units. For example, data can be mapped to absolute or relative points in geographic space. In one embodiment, weather patterns, which are eventually mapped to simulation space 140 and which simulated force entities 144 variably respond to can be programmed based on weather and/or weather patterns extracted from a corresponding real-world volumetric space 110. Data can also be mapped to human and/or human sets, that reside within geographic space and that have an ability to move from one unit of geographic space to another.

In step 330, a degree or level of confidence for the mapped data elements can be determined. In optional step 332, data elements can be classified in accordance to a source type and/or a specific data source can be tagged or otherwise related to the data elements.

The data elements can be recorded in volumetric storage space meaning the data elements can be encoded into a voxel database, as shown by step 334. The voxel database can optionally establish features composed of one or more shape primitives. These features can be related, such as through relational database (RDBMS) indexes and database primary/secondary keys, to voxels. An RDBMS is one contemplated indexing tool and other indexing mechanisms can be used with the disclosure. When data elements are recorded in volumetric storage space, a determination can be made as to whether each data element is to be referenced against a set of one or more voxels, against a defined feature, or both, as indicated by step 336.

In optional step 338, data can be semantically optimized to minimize data redundancy. For example, approximately equivalent data from multiple sources can be combined into a common data element. This semantic combination can affect confidence values associated with a data element. For example, when multiple sources report a single data element consistently, a confidence value in that data element will increase. In optional step 340, a voxel database space can be compacted to minimize storage requirements. Different voxel (e.g., raster based) compaction algorithms can be utilized, which include loss-less compaction algorithms and lossy compaction algorithms.

Figure 3B:
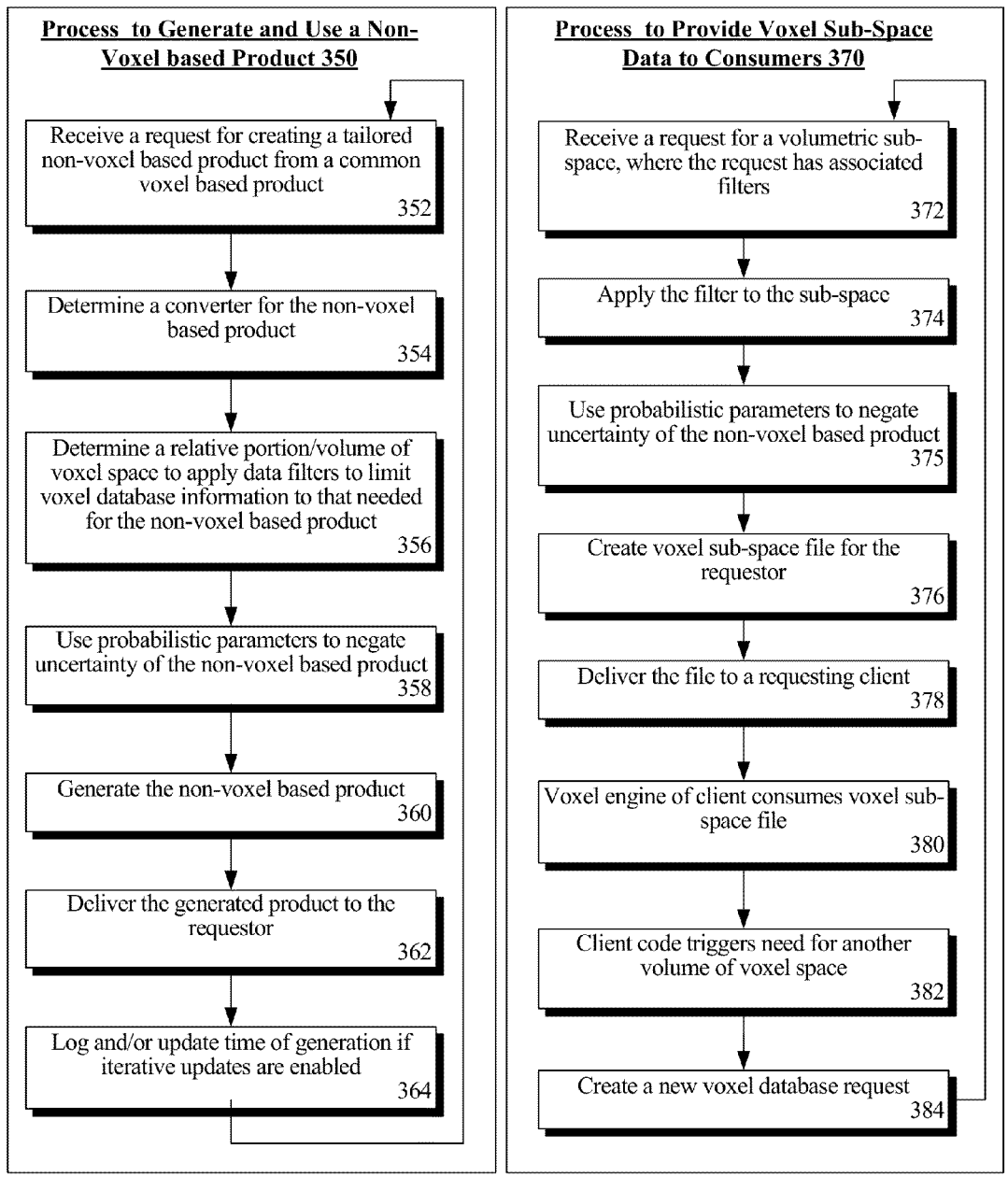
FIG. 3B is a set of flow charts for utilizing data of a voxel database in accordance with an embodiment of disclosure.

The voxel database populated though a process, such as process 310, can thereafter be treated as a common repository or centralized source for geospatially related information. This centralized source can be utilized by different consumers in different ways. In one scenario (process 350 shown in FIG. 3B), the voxel database can be used to generate a non-voxel based product. In another scenario (process 370 shown in FIG. 3B), the voxel database can provide voxel-subspace data sets to requestors, which these requestors can consume directly utilizing an internal voxel engine.

Process 350 can begin in step 352, where a request is received by a voxel database server. The request can be for creating a tailored non-voxel based product from a common voxel based product. An appropriate converter for the request can be determined in step 354.

In step 356, a relative portion or volume of volumetric storage space needs to be determined. That is, the request will rarely be for an entire volume region stored by the voxel database, but will likely be for a volumetric subspace specifically needed by the non-voxel based product. Additionally, data within the requested volumetric subspace can be filtered by applied data filters, so that only the information needed for a specific product of the request is considered. In step 358, probabilistic parameters can be utilized to negate uncertainty inherent in the voxel database when generating the non-voxel based product. Different thresholds and/or parameters can be utilized to determine what level of uncertainty is to be retained within the non-voxel based product, which is generated in step 360. The generated product can be delivered to the requestor in step 362.

Some generated products can require periodic updates form the voxel database in order to retain information currency. In one embodiment, optimizations can be implemented so that only relatively new information needs to be considered for some update operations. When iterative updates are a concern, information can be logged and/or time attributes of the voxel database can be updated as appropriate, which is shown by step 364. The process 350 can repeat as needed, which is expressed by proceeding from step 364 to step 352.

Process 370 can begin in step 372, where a request for a volumetric sub-space is received. The request can have a set of associated filters. Unlike process 350, it is contemplated that a requestor of process 370 can directly consume voxel encoded information. In step 374, the filter can be applied to the voxel sub-space to conditionally exclude data of the voxel database. This is important as the voxel database can be a centralized repository that stores a myriad of data attributes in a voxel related manner, where only a subset of the data attributes are of concern for a specific requestor. In optional step 375, probabilistic parameters can be applied to negate uncertainty when generating the voxel sub-space. This optional step 375 can be utilized when satisfying a request (step 372) for a non-probabilistic voxel subspace.

In step 376, a file (or set of files) containing the requested information can be created. In step 378, the created file(s) can be delivered to a requesting client, such as by delivering the file(s) over a network. A voxel engine of the client can consume or utilize the voxel sub-space file, as shown by step 380. In one embodiment, the voxel database can be directly accessible and used by the clients, in which case a creation and utilization of a locally create file (of a voxel subspace) can be unnecessary.

In one embodiment, the voxel sub-space files can be encoded in a local media storage area (e.g., hard drive) for use by a client as needed. This prevents a need for continuous and/or stable network connectively between the client and the voxel database. In one embodiment, suitable voxel sub-space laden files can be encoded in a portable medium (e.g., optical, magnetic, or other) and disseminated/located to clients periodically.

In another embodiment, data sets can be continuously requested by a client. That is, executing client code can trigger a need for another volume of volumetric storage space, as shown by step 382. When no local cache exists for this needed information, a new voxel database request (submitted over a network) can be created, as shown by step 384, which results in the request being handled in step 372.

Figure 4:
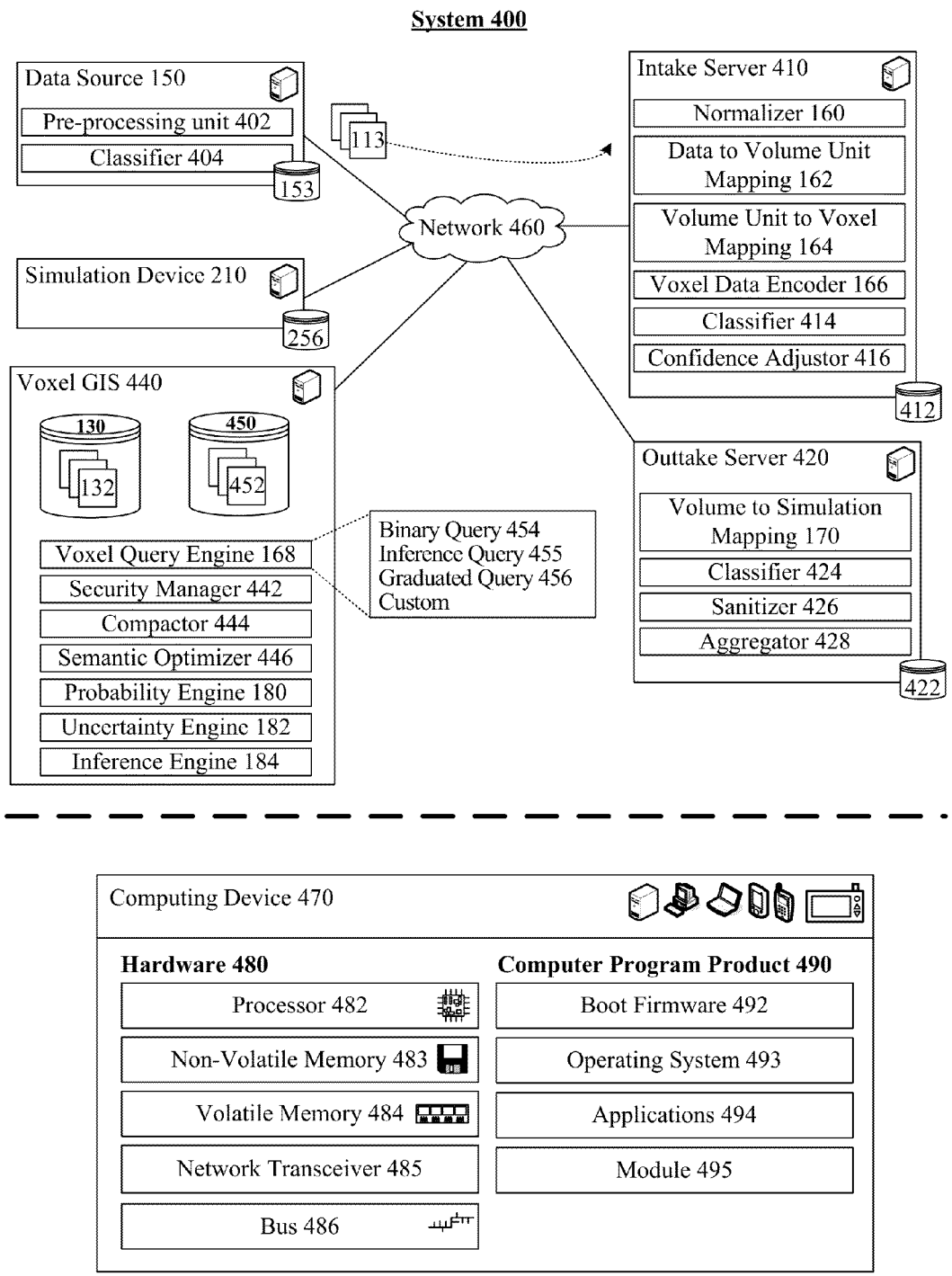
FIG. 4 is a schematic diagram of a system including a voxel database in accordance with an embodiment of disclosure.

FIG. 4 is a schematic diagram of a system 400 including a voxel database 130 in accordance with an embodiment of the inventive arrangements disclosed herein. In system 400, a set of data sources 150, a set of simulation devices 210, an intake server 410, an outtake server 420, a voxel geographic information system 440, and other such components can be communicatively linked via a network 460. In lieu of connectivity via network 460, components of system 400 can exchange information via portable media data exchanges, paper document correspondences, human-to-human communications, and the like. The shown components (as items 150, 410, 420, 210, 440) represent one embodiment of the disclosure and are not to be construed as being a limitation of the disclosure's scope.

Various components of system 400, such as items 150, 410, 420, 210, 440, can include one or more computing devices 470, which can include hardware 480 and computer program products 490. The computing devices 470 can be general purpose computing devices, such as personal computers, servers, or in-vehicle computers. The devices 470 can also be special purposed devices specifically manufactured/constructed for a tailored purpose. A special purposed device can have unique hardware, electronic boards, firmware, etc, which is not able to be easily modified by software and used for a different purpose. In various embodiments, devices 470 can be implanted as stand-alone devices, as virtual devices, as distributed devices, as cooperative devices, and the like.

Hardware 480 can include a processor 482, nonvolatile memory 483, volatile memory 484, network transceiver 485, and other components linked via a bus 486. The computer program products 490 can include programmatic instructions that are digitally encoded in a memory (e.g., memory 483, 484) and able to be executed by the processor 482. Computer program products 490 include boot firmware 492 (e.g., basic input/output system (BIOS)), an optional operating system 493 (i.e., special purposed devices can be optimized so an operating system 493 is merged with applications 494 and/or modules 495), applications 494, and other executable modules 495. The operating system 493 can include mobile device operating systems, desktop operating systems, server operating system, virtual operating systems, and/or distributed operating systems.

Unlike many computing systems, system 400 can be a security sensitive one where data classifications are highly important. That is, information acquired from data sources 150, stored in voxel GIS 440, and used to drive simulation devices 210 can include unclassified, secret, top secret (including compartmentalization) information. Classification components 404, 414, 424 can exist, which implement comprehensive and conservative rules to automatically classify information into appropriate classifications. Additionally, sanitizers (e.g., sanitizer 426) can be used in system 400 to downgrade semantic content (e.g., from secret to unclassified, for example) of conveyed data elements to ensure that classification based restrictions are not violated. Moreover, different network 460 channels and information handling standards can be imposed based on classification level of the information being conveyed. A further complication is that aggregating and/or analyzing data from different sources 150 can change a classification level of the base data. Automated mechanisms (i.e., classifier 414, aggregator 428, and/or voxel GIS 440, when aggregating data from multiple sources 150, can reevaluate and appropriately adjust resultant security classification levels) to conservatively handle data classifications are needed in system 400, especially in embodiments where data acquisition to model production (e.g., duration 212 of embodiment 202, for instance) is expedited.

The security sensitivity requirements can result in physically separate channels (e.g., within network 460, for example) for information conveyance. Further, storage regions for the different data classifications (e.g., within voxel GIS 440, for example) can remain isolated from each other. Known standards for handling classified information exist as do a myriad of automated techniques, which can be utilized for system 400. Various components (classifier 404, 414, 424, security manager 442, sanitizer 426) are shown in system 400 to express that system 400 can implement security classification technologies. Comprehensive coverage of these known technologies is not the focus of this disclosure. For simplicity of expression, classification techniques have not been overly elaborated upon herein. It should be understood that integration of classification specific techniques for information handling are contemplated for the disclosure.

It should also be acknowledged that the specific arrangements of system 400 are expected to vary from implementation-to-implementation. For example, discrete network 460 attached servers are shown for intake (intake server 410) and outtake (outtake server 420) of information to and from the voxel GIS 440. As shown, intake server 410 can perform intake processing operations (process 310, for example). Outtake server 420 can perform out taking processing operations (process 350 and/or 370, for example). In one embodiment, operations attributed to server 410 or 420 can be integrated into the voxel GIS 440 or other system 400 components (e.g., one or more intake server 410 operations can be performed by data source 150; one or more outtake server 420 operations can be performed by simulation device 210). For example, in one embodiment, pre-processing unit 402 can optionally perform operations described for normalizer 160 and/or data to volume unit mapping component 162.

Additional components not explicitly expressed in association with system 400, which are consistent with performing operations described in the disclosure, are to be considered present in system 400. Further, logical mappings from system 400 components to operations described herein are assumed to be present. For example, in various contemplated embodiments, compactor 444 can perform operations described in step 340 of FIG. 3A; semantic optimizer 446 can perform operations described in step 338 of FIG. 3A; and, confidence adjustor 416 can perform operations previously described in step 330 and 338. Further, operations of the output generator 172 are to be considered as being performed by components of simulation device 210.

Turning to voxel GIS 440, a number of characteristics should be noted. First, as new information for voxel GIS 440 is acquired (from data sources 150); a probability distribution of surface location and surface appearance can be dynamically and programmatically constructed (using Bayesian statistical learning algorithms, for example). In this sense, voxels of the GIS 440 do not store a fixed appearance (of volume units 112 from a real-world volumetric space 110) but instead store a dynamic probability of multiple appearances, which can be learned and/or refined over time.

This characteristic of GIS 440 not only permits efficient handling of uncertainty, but turns traditional data overload challenges into an advantage. That is, over time, information acquisition via satellites, SIGINT, and other automated sources has geometrically increased. Concurrently, a quantity of human analysts responsible for rapidly responding to acquired information has decreased and/or remained constant. In the past, different information channels or products from different sources 150 were handled in a stove-piped manner. Different human analysts would receive and/or analyze satellite data, SIGINT data, HUMINT, PHYOP data, and the like. One result of this situation is that collected data is often not be analyzed in a timely manner. Additionally, collected data is typically analyzed in isolation (e.g., single images from satellites are analyzed by people lacking pertinent geospatial related data from other sources 150). Fusion tools are currently deficient and/or lacking, which is a situation expected to worsen in absence of a paradigm shift in how information is managed and analyzed. The voxel GIS 440 is a central component for this needed paradigm shift.

A number of fusion tools for use with the voxel GIS 440 can include an enhancement to the query engine 168, which permits binary queries 454, inference queries 455, graduated queries 456, customized queries, and combinations thereof. Binary queries 454 can be the query equivalent of the binary mode in that only information greater than a defined threshold certainty level will be returned—other voxel database 130 stored information will be ignored. Inference queries 455 can be the query equivalent of the inference mode in that an inference engine 184 can be used to fill in information gaps based upon best estimates, when sufficient directly encoded data is lacking Graduated queries 465 can return all information contained in the voxel GIS 440 relevant for a query request along with a certainty level associated with that information.

The different queries 454-456 can be command line activate-able queries and/or can be GUI initiated queries. In one embodiment, the queries 454-456 can be user transparent in that users can submit standard queries (e.g., SQL queries) to the voxel query engine 168, which produces variable results depending on which mode (binary, inference, graduated, custom, etc.) is enabled for the engine 168.

The probability engine 180 can be an engine able to compute a probability or a certainty value for voxel mapped data element stored in the voxel database 130. The uncertainty engine 182 can be an engine of variable performance that performs differently depending upon certainty values associated with voxel database 130 data. Inference engine 184 can be used to infer data set information that is lacking in voxel database 130. That is, engine 184 can estimate information needed to generate a complete information picture based on preexisting information elements and patterns discerned from the preexisting data elements. The inference engine 184 can be used for any type of data set, which includes geospatial data-like terrain as well as semantic information. In one embodiment, the engines 180-184 can dynamically perform their functions based on data stored in voxel GIS 440 using configurable heuristics, deterministic algorithms, and combinations thereof.

Figure 5:
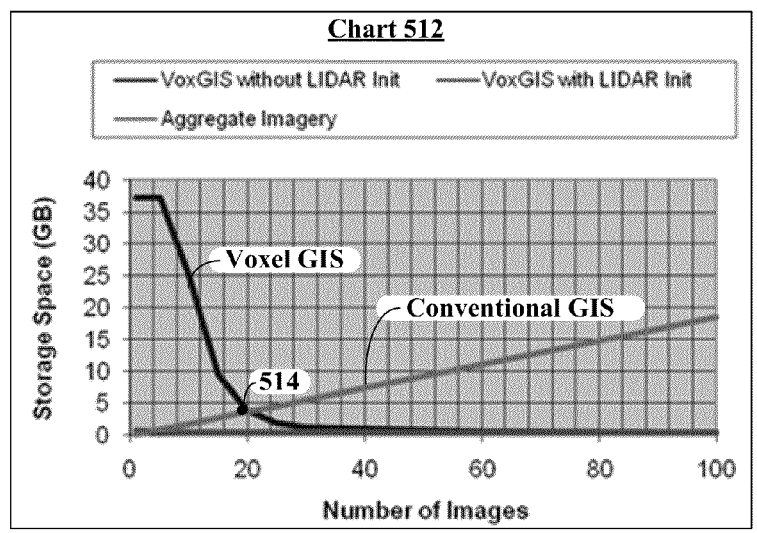
FIG. 5 demonstrates aggregation efficiency of a voxel database and a relationship between voxels, shapes, and features in accordance with an embodiment of disclosure.
Figure 5:
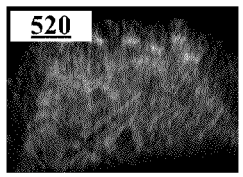
Figure 5:
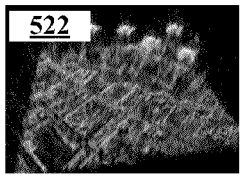
Figure 5:
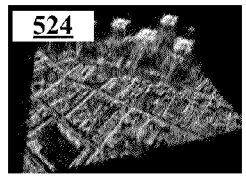
Figure 5:
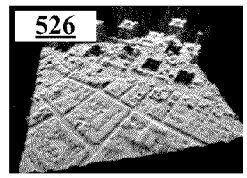
Figure 5:
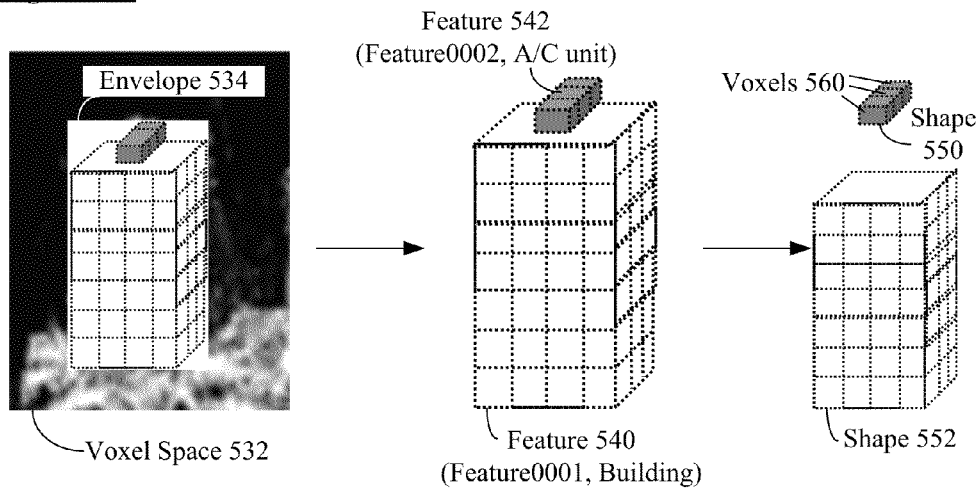

Diagram 510 (shown in FIG. 5) illustrates how voxel GIS 440 is able to efficiently aggregate information. This aggregation efficiency actually accelerates as information density increases. For example, as a number of images encoded within GIS increases, Voxel GIS 440 storage requirements can actually decrease (or at least become more efficient than the straight line increase experienced using a traditional GIS). Aggregation efficiency results from the "holographic-like" nature of voxel storage space, where an increase in information density increases clarity of the volumetric storage space 120. Uncertainty is reduced, which can reduce storage requirements (e.g., decreasing overhead needed for maintaining "noise" or abnormal data points in volumetric storage space 120).

Aggregation efficiency of the Voxel GIS 440 is represented in diagram 510 by a set of images 520-526 of a stored volumetric storage space. The images 520-526 are static geospatial images of real-world terrain taken from satellite images, yet the demonstrated principle is consistent regardless of the specific input being encoded in volumetric storage space. For example, as more information is captured for individuals in a population, social characteristics of the population become increasingly refined.

Image 520 shows a visual depiction of a volumetric storage space formed from ten images. Image 522 shows the same volumetric storage space after 20 images have been processed. Image 524 shows the volumetric storage space after 30 images. Image 526 shows same volumetric storage space, that has been refined using LIDAR points in conjunction with the thirty images. As shown, it becomes evident that an increase in information density decreases uncertainty of an encoded volumetric storage space and increases "fidelity" of the stored information. That is, as information density increases surface probabilities become better defined. More voxels (and associated data) in "empty space" can be discarded.

It can be mathematically shown that as information density approaches infinity, storage space requirements for the voxel GIS 440 approaches (effectively equals) a theoretical minimal storage space required by the imagery (and/or data elements being stored). At relatively low information densities (compared to that currently being handled by intelligence agencies) a cross-over point 514 occurs, where it is more efficient to store equivalent data within a voxel GIS 440 than it is to store equivalent data in a non-voxel GIS (e.g., a conventional GIS). Post cross-over point 514 voxel GIS 440 storage space advantages continue to increase, as shown by chart 512. It should be noted that although many examples presented herein are in context of intelligence activities, voxel GIS 440 aggregation efficiencies and techniques are domain independent can be used for any geospatial data set.

In voxel database 440 information can be indexed against voxels in different manners. In one embodiment, some records 132 can be directly indexed against uniquely identified voxels (in voxel database 130, for example). Other records 452 can be indexed against features, which are stored in a feature data base 450. Cross indexing between voxel database 130 and feature database 450 can occur.

A feature can be a representation of an object in a physical world (or a simulated object) having its own unique identity and characteristics. Buildings, trees, highways, rivers, lakes, and the like are examples of features. A volume in volumetric storage space 120 occupied by a feature can be defined by a volumetric envelope. The volumetric envelope can be composed of one or more shape primitives. Shape primitives can be a set of basic volumetric shapes that are easily defined by a relatively small number of numeric parameters.

When features and voxel references are both stored in the voxel GIS 440, different consistent semantic mappings can be utilized. In one embodiment, voxel-level semantic content can include spectral signature attributes (e.g., Multispectral Imaging (MSI), Hyperspectral Imaging (HSI), etc.), visual attributes (relating to a human's sense of sight), olfaction attributes (relating to a human's sense of smell), audition attributes (relating to a human's sense of hearing), gustation attributes (relating to a human's sense of taste), somatosensory attributes (relating to a humans sense of touch, temperature, proprioception, and nociception), material composition attributes, and the like.

Diagram 530 provides an illustrated example for describing features. In diagram 530, an envelope 534 of a volumetric storage space 532 can contain features 540 and 542. Feature 540 can be uniquely identified as Feature0001, which is a feature identifier. The feature type of feature 540 can be a building. Feature 542 can be an air conditioning unit positioned on top of the building. As shown, each feature 540, 542 is formed from single shape primitives 550 and 552, which are both boxes. Features can include any number (from 1 to N) of shape primitives. Each shape can include (be mapped to) a set of voxels. For example, three voxels 560 can form shape 550. In one embodiment, the voxel GIS 340 can include software implemented tools to automatically detect and define shapes, features, and envelopes in a given volumetric storage space.

While any number of shape primitives can be supported by system 400, some common shape primitives include boxes, cylinders, spheres, and cones.

In one embodiment, shape primitives used by system 400 can conform to existing standards for enhanced compatibility. For example, shape primitives can conform to Open Graphics Library (OpenGL) standards for 3D computer graphics. In one embodiment, Coin3D, which is a C++ object oriented retained mode 3D graphics Application Program Interface (API) used to provide a higher layer of programming for OpenGL, objects can be mapped to shape primitives as follows: a box equates to a SoCube; a cylinder equates to a SoCylinder; a sphere equates to a SoSphere; and, a cone equates to a SoCone. In another embodiment, mappings to geospatial scheme of the National Geospatial-Intelligence Agency (NGA) can be as follows: a box equates to a RectangularPrism; a cylinder equates to a Vertical Cylindrical; a sphere equates to a spherical; and, a cone can have no equivalent. In still another embodiment, mappings to a computer aided design (CAD) scheme can be as follows: a box equates to an Axis Aligned Bounding Box (AABB); a cylinder equates to a Cylinder, Flat Ends; and, a sphere equates to a Cylinder, Round Ends, Zero Length.

In one embodiment, the voxel query engine 167 of the Voxel GIS 440 can perform seamless and user transparent queries across the different databases 130, 450. It should be noted, that although being referred to as different databases 130, 450 a single unified database (or other indexed repository) can be utilized in the disclosure for both voxel-indexed records 132 and feature indexed records 452.

Figure 6:
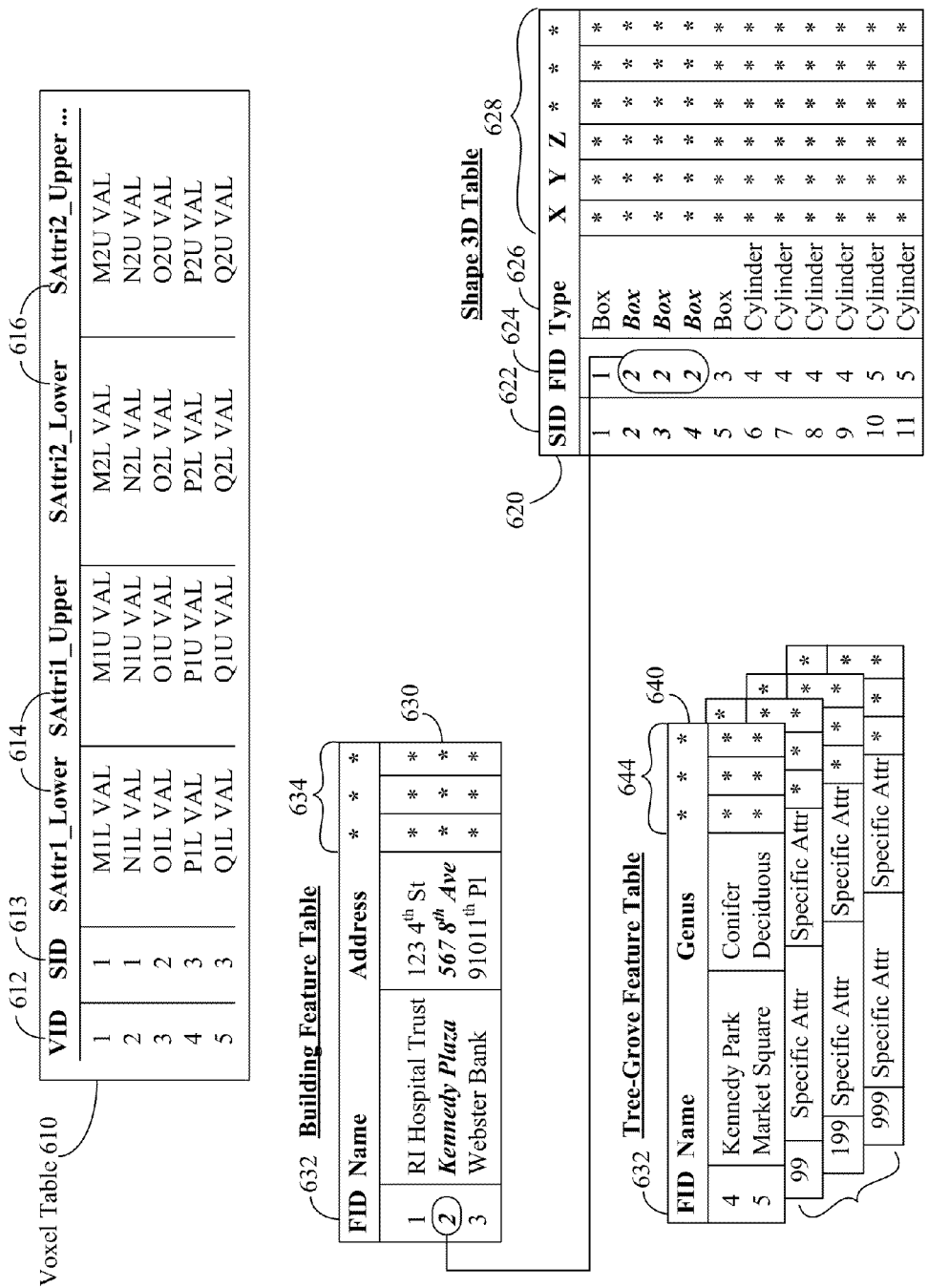
FIG. 6 illustrates a set of tables for a voxel GIS in accordance with an embodiment of the disclosure.

FIG. 6 illustrates a set of tables 610, 620, 630, 640 for a voxel GIS in accordance with an embodiment of the disclosure. In one embodiment, the tables 610, 620, 630, 640 can be RDBMS tables in third normal form. The tables 610, 620, 630, 640 can include a plurality of records (e.g., records 132 and 452).

Voxel table 610 includes a VID 612, which is a unique identifier for each voxel. SID 613 can be a unique identifier for a shape primitive which forms all or part of a shape envelope. Any quantity (1 . . . N) of attributes can be associated with each unique voxel of table 610. For example, each detailed semantic content element can have an associated attribute 614, 616. In one embodiment, each attribute 614, 616 in the voxel table 610 can have at least two values, such as a lower value and an upper value. The multiple values can be used to record different levels of certainty for each attribute 614, 616. For example, one source can report a first value of an attribute 614, 616 with a definable degree of certainty and a different value can be reported for the same attribute 614, 616 with a different degree of certainty. Although two values (lower and upper) are shown for each attribute 614, 616, any number of values (1 . . . N) can be used in table 610.

Each record in shape table 620 can includes a unique shape identifier, SID 622. A secondary key for a feature ID 624 can also be included. Table 620 can also include a type 626 attribute. A set (0 . . . N) of additional shape specific attributes 628 can also exist.

Each unique feature can be associated with a feature identifier, FID 632. In one implementation, different types of tables 630, 640 can exist, one for each unique category or type of object, which corresponds to a feature. For example, one table 630 can exist for buildings and another table 640 can exist for tree groves. Each table 630, 640 can have an associated set of attributes 634, 644, which are unique to a specific type of object. It should be appreciated that arrangements of tables 610, 620, 630, 640 are presented to illustrate a concept expressed herein and are not to be construed as a limitation of the disclosure.

The disclosure may be embodied as a method, system, or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In a preferred embodiment, the disclosure is implemented in software which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device. Any suitable computer-usable or computer-readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD.

Computer program code for carrying out operations of the disclosure may be written in an object-oriented programming language such as JAVA, Smalltalk, C++, or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in FIGS. 1-6 illustrate the architecture, functionality, and operation of possible implementations of systems, methods, and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
    a database representing a volumetric storage space comprising a set of unique volumetric storage units, wherein data elements are stored to specific ones of the volumetric storage units, wherein a spatial position of the data elements within the volumetric storage space is defined at least in part by which of the volumetric storage units the data elements are stored, wherein the database is a probabilistic database in which each of the data elements has an associated probability, which is determined based on a level of consistency between that data element and other ones of the data elements that are stored in the database;
    a probability engine operable to dynamically determine a certainty value for objects included within the volumetric storage space, wherein the more perfectly one of the objects is represented within the probabilistic storage space, the greater the certainty value determined by the probability engine will be for that object, and wherein the less perfectly one of the objects is represented within the probabilistic storage space, the lesser the certainty value determined by the probability engine will be for that object; and
    a query engine configured to permit a user to query the volumetric storage space for objects, wherein the query engine is operable to execute binary queries, inference queries, and graduated queries.

2. The system of claim 1, wherein at least a portion of the objects for which the probability engine determines the certainty value comprise objects that each displace a volume of the volumetric storage space that is greater than a volume of a single one of the volumetric storage units.

3. The system of claim 1, wherein the data elements of the volumetric storage space when stored in the database are referenced against volumetric storage units and are not directly referenced against other defined objects present in the volumetric storage space.

4. A system comprising:
a probabilistic database comprising:
   a data elements of a volumetric storage space, comprising a plurality of volumetric units,
   wherein each volumetric unit has a unique identifier in the probabilistic database,
   wherein objects displacing a volume of greater than a single volumetric unit are contained in the volumetric storage space,
   wherein at least a portion of the objects have a probability greater than zero of being contained in the volumetric storage space and have a probability of greater than zero of not being contained in the volumetric storage space,
   wherein a probability of whether one of the objects is present in the volumetric storage space depends upon whether data elements for that one of the objects are consistently present in volumetric units of the volume displaced by that one of the objects; and
a query engine configured to permit a user to query a volumetric sub-space of the volumetric storage space consisting of a plurality of volumetric units, wherein the query engine is operable to execute binary queries, inference queries, and graduated queries.

5. The system of claim 4, further comprising:
a probability engine operable to dynamically determine a certainty value for the objects, wherein the certainty value is a value from zero to one hundred percent which is based upon a statistical analysis of a portion of the data elements relating to a volume that an evaluated one of the objects is to displace within the volumetric storage space, wherein the portion of the data elements comprise inconsistent information with regards to the presence or absence of the evaluated one of the objects.

6. The system of claim 5, further comprising:
an inference engine operable to infer an existence of portions of the objects within the volumetric storage space based upon the data elements, wherein data for the portions of the objects inferred by the inference engine are not expressly stored in the probabilistic database, yet wherein the portions of the objects inferred by the inference engine is returnable by the probabilistic database in response to database queries submitted to the probabilistic database.

7. The system of claim 4, further comprising:
an uncertainty engine operable to take variable action on a set of the objects contained in the volumetric storage space based upon certainty values computed each of the set of objects as computed by the probability engine.

8. The system of claim 4, wherein the probabilistic database is a component of a geographic information system, which also includes an feature table comprising a plurality of feature records, wherein each feature record comprises a key for a unique object, wherein the object is one of the objects that displaces a volume of the volumetric storage space, wherein each feature record is indexed to at least one volumetric unit, wherein a spatial position of the objects represented by the feature records within the volumetric storage space is determined based upon which ones of the VSU the feature records are indexed to.

9. A system comprising:
a volumetric storage unit (VSU) database for storing probabilistic geospatially referenced information within an indexed tangible storage medium, said VSU database comprising:
   a plurality of VSU records in a VSU table, where each of the records has a unique VSU identifier,
   wherein said VSU table is stored in a tangible storage medium; and each VSU record comprising visual attributes of a geometric space,
   wherein uniquely defined volumetric storage units (VSUs) are a volume unit of a volumetric storage space,
   wherein a correspondence exists between VSUs in the volumetric storage space and volume units of a real world volumetric space from which geospatial data was directly gathered and encoded within the VSU database,
   wherein each VSU record further comprises semantic attributes for the geometric space that are not visual-attributes of the geometric space, and
   wherein the VSU referenced geospatial information is internally inconsistent, which results in a probabilistic storage format; and
a probability engine operable to dynamically determine a certainty value for an object of the VSU database, wherein the certainty value is a value from zero to one hundred percent which is based upon a statistical analysis of the internally inconsistent geospatial information referenced against the VSUs; and
a plurality of feature records in a plurality of feature tables, wherein each of the feature records comprises a unique feature identifier, a feature type, and a plurality of feature attributes, wherein a feature corresponds to a real world object, wherein different feature tables are tables specific to different types of real world objects, and wherein the feature attributes of the feature tables are specific attributes for the real world objects, which vary from feature table to feature table;
a plurality of shape records in a shape table, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each record of the VSU table comprises a foreign key to a shape identifier wherein a one-to-many relationship exists between VSUs and primitive shapes.

10. The system of claim 9, further comprising an uncertainty engine operable to take variable action on a set of geospatially positioned object stored within the VSU database based upon certainty values computed for the set of geospatially positioned objects as computed by the probability engine.

11. The system of claim 9, further comprising:
an inference engine operable to infer an existence of content in the volumetric storage space based upon data explicitly present in the VSU database, wherein the inference engine is only able to be used to infer content related to an object when the probability engine computes a certainty value for that object that is over a threshold, wherein the inferred content related to the object is not expressly stored in the VSU database, yet the inferred content is returnable by the VSU database in response to database queries submitted to the VSU database.

12. A simulation device comprising: a processor; a non-volatile memory; a volatile memory; at least one input device; at least one output device; a bus communicatively linking the processor non-volatile memory, volatile memory, the input device, and the output device to each other; a plurality of computer program products tangibly stored on the non-volatile memory or the volatile memory, wherein instructions of the computer program products are executable by the processor, wherein said computer program products comprise: a volumetric storage unit (VSU) engine able to directly consume VSU-encoded volumetric data for of a volumetric storage space, wherein each of the VSUs is a volume unit of a volumetric storage space, wherein a correspondence exists between VSUs in the volumetric storage space and simulation units in a simulation space; a simulation application for generating a user interactive interface for the simulation space, wherein said simulation application receives user input via the plurality of input device and responds to the user input by altering expressed characteristics of the simulation space, wherein output for the simulation space is produced by the output devices, wherein the simulation application permits a user to selectively navigate within the simulation space; wherein said user interactive interface comprises at least two different user selectable interactive modes, wherein each of the modes changes how the user interface handles objects of the simulation space based upon a certainty level value associated with each of the objects, wherein the volumetric storage space is a probabilistic space and wherein the certainty level reflects a probability that an associated object is contained in the volumetric storage space.

13. The simulator of claim 12, wherein one of the at least two different user selectable interface modes is a binary mode interface, wherein the binary mode interface either shows or hides an object in the user interface based on whether the certainty level value exceeds a threshold value of uncertainty.

14. The simulator of claim 12, wherein one of the at least two different user selectable interface modes is a inferential mode interface, wherein the inferential mode interface either fills-in blanks of an object when presenting the object in the user interface or not, wherein the blanks are selectively filled-in to include best-estimate content believed to be associated with the object that is not explicitly included in the volumetric storage space.

15. The simulator of claim 12, wherein one of the at least two different user selectable interface modes is a graduated mode interface, wherein the graduated mode interface visually represent a level of uncertainty using a set of visual cues, wherein as a level of certainty of presented information changes, a value of a variable visual cue changes in a corresponding fashion.

16. The simulator of claim 12, wherein the user interactive interface comprises: a configuration screen for specifying configurable parameters relating to uncertainty and a manner in which the user interactive interface is to presenting objects associated with varying certainty values, wherein the configuration screen permits a user to select from among a set of different interface modes that include a binary mode, an inference mode, and graduated mode.

17. A method for handling geospatially related data comprising: a plurality of sensors capturing raw data that geospatially corresponds to a real world volumetric space; segmenting the real-world volumetric space into a plurality of regular volumetric units, wherein datum of the raw data is indexed against the regular volumetric units; mapping each regular volumetric unit of the real-world volumetric space to a VSU in a volumetric storage; and within a VSU database, establishing a plurality of records in a VSU table, where each of the records has a unique VSU identifier, wherein said VSU table is stored in a tangible storage medium; for each record, storing values for a plurality of different attributes, said attributes comprising visual attributes, wherein VSU referenced geospatial information corresponding to the real-world volumetric space is internally inconsistent, which results in a probabilistic storage format; receiving a request for VSU database information for a request defined sub-volume of volumetric storage space; querying said VSU database to generate a response of the defined sub-volume of the volumetric storage space; and during the querying, dynamically determining a certainty level value for objects of the result set, wherein the certainty value is a value from zero to one hundred percent which is based upon a statistical analysis of the internally inconsistent geospatial information referenced against the VSUs; and providing the response to a simulator having a user interface for a simulated three dimensional volume of space that corresponds to said defined sub-volume of volumetric storage space, wherein the simulator comprises hardware and computer program products stored on a tangible storage medium and executable upon said hardware.

18. The method of claim 17, further comprising: the VSU database receiving and responding to a plurality of different requests, wherein the different requests cause the VSU database to generate different types of queries, said query types comprising binary queries, inference queries, and graduated queries.

19. The method of claim 17, wherein the user interface of the simulator is a binary mode interface that either shows or hides geospatial information within the interface based on whether the certainty level value associated with the geospatial information exceeds a threshold value of uncertainty.

20. The method of claim 17, wherein the user interface of the simulator is a inferential mode interface that fills-in geospatial blanks of an underlying data set causing output presenting in the inferential mode interface to include best-estimate values that may be inaccurate and that are not explicitly defined in the VSU database.

21. The method of claim 17, the user interface of the simulator is a graduated mode interface that visually represents a level of uncertainty using a set of visual cues, wherein as a level of certainty of presented information changes, a value of a variable visual cue changes in a corresponding fashion.

22. The method of claim 17, the user interface of the simulator comprising a: a configuration screen for specifying configurable parameters relating to uncertainty and a manner in which the user interface is to presenting objects associated with varying certainty values, wherein the configuration screen permits a user to select from among a set of different interface modes that include a binary mode, an inference mode, and graduated mode.

23. The method of claim 17, further comprising: receiving user input to navigate to a user desired location in the simulation space; and responsive to the user input, performing programmatic actions to alter output produced by the simulator to correspond to the user navigated portion of the simulation space, wherein a correspondence exists between volumetric units of the simulation space and VSU of the volumetric storage space, and wherein a correspondence exists between volume units of a real-world volumetric space and the VSU of the volumetric storage space.

24. The method of claim 17, further comprising: within a feature database, establishing a plurality of feature records in a plurality of feature tables, wherein each of the feature records comprises a unique feature identifier, a feature type, and a plurality of feature attributes, wherein a feature corresponds to a real world object, wherein different feature tables are tables specific to different types of real world objects, and wherein the feature attributes of the feature tables are specific attributes for the real world objects, which vary from feature table to feature table; within a feature database, establishing a plurality of shape records in a shape table, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each record of the VSU table comprises a foreign key to a shape identifier, wherein a one-to-many relationship exists between VSU and primitive shapes; querying said VSU database to generate the response set of VSU and feature and shape attribute values corresponding to the set of VSU; and providing the response set to the simulator.

* * * * *